United States Patent
Hong

[19]

[11] Patent Number: 6,106,725
[45] Date of Patent: *Aug. 22, 2000

[54] POINT-OF-USE REMOVAL OF LEAD AND COPPER IN DRINKING WATER USING HYDROXYLAPATITE AND CARBONATE MINERALS

[75] Inventor: Puikwan Andy Hong, Salt Lake City, Utah

[73] Assignee: University of Utah, Salt Lake City, Utah

[*] Notice: This patent is subject to a terminal disclaimer.

[21] Appl. No.: 08/728,819

[22] Filed: Oct. 10, 1996

Related U.S. Application Data

[63] Continuation-in-part of application No. 08/410,216, Mar. 24, 1995, Pat. No. 5,665,240.

[51] Int. Cl.[7] ........................................ C02F 1/52
[52] U.S. Cl. .................. 210/667; 210/679; 210/688; 210/912
[58] Field of Search ........................ 210/667, 679, 210/688, 723, 912, 663, 665, 694

[56] References Cited

U.S. PATENT DOCUMENTS

| | | | |
|---|---|---|---|
| 3,855,125 | 12/1974 | Lin | 210/906 |
| 4,096,064 | 6/1978 | du Fresne | 210/120 |
| 4,196,081 | 4/1980 | Pavia | 210/284 |
| 4,671,882 | 6/1987 | Douglas et al. | 210/720 |
| 4,737,356 | 4/1988 | O'Hare et al. | 423/659 |
| 4,789,475 | 12/1988 | Harte et al. | 210/502.1 |
| 4,902,427 | 2/1990 | Szczepanik | 210/484 |
| 4,994,191 | 2/1991 | Kuznicki et al. | 210/688 |
| 5,053,139 | 10/1991 | Dodwell et al. | 210/688 |
| 5,076,941 | 12/1991 | Boffardi et al. | 210/753 |
| 5,082,568 | 1/1992 | Holler | 210/679 |
| 5,098,579 | 3/1992 | Leigh et al. | 210/724 |
| 5,133,871 | 7/1992 | Levy | 210/688 |
| 5,665,240 | 9/1997 | Hong | 210/688 |
| 5,711,015 | 1/1998 | Tofe | 210/679 |

*Primary Examiner*—Ivars Cintins
*Attorney, Agent, or Firm*—James L. Sonntag

[57] ABSTRACT

A process for removing lead and copper from drinking water discharged from a drinking water outlet while suppressing the concentration of phosphate ions comprising directing the water through a matrix comprising phosphate mineral with a very low phosphate solubility, and a solid carbonate mineral which is slightly soluble in water. The matrix is sized such that there is sufficient contacting between the water and the matrix to form a lead phosphate precipitate, reduce the lead concentration in the water below 15 parts per billion, and suppress the phosphate ion concentration to 5 mg/L, preferably 3 mg/L, or below.

16 Claims, 2 Drawing Sheets

POINT-OF-USE REMOVAL OF LEAD AND COPPER IN DRINKING WATER USING HYDROXYLAPATITE AND CARBONATE MINERALS

RELATED APPLICATIONS

This application is a Continuation-in-part of application Ser. No. 08/410,216, filed Mar. 24, 1995, now U.S. Pat. No. 5,665,240, issued Sep. 9, 1997.

FIELD OF THE INVENTION

This invention relates to the removal of pollutants from drinking water, such as lead, copper, other heavy metals from drinking water, chlorine, disinfection by-products, and other organic compounds.

BACKGROUND OF THE INVENTION

State of the Art

The treatment of water to render it safe for drinking has become complex process, due to the variety and complexity of water pollutants, and different processes required to remove them. The pollutants of main concern are (1) heavy metals, such as lead and copper, (2) chlorine, disinfection byproducts, and other organic pollutants, and (3) microorganisms.

Heavy Metals

The elevated concentration of lead in drinking water has become a major public health concern. A recent sampling by the U.S. Environment Protection Agency (EPA) of 660 large public water systems found that about 32 million Americans in 130 cities drink water from systems that exceed the federal action limit of 15 parts per billion and that 10 cities exceed the limit by as much as 5 times. The natural waters in many small towns and rural areas in the United States, especially in the southwest, often contain a high concentration of lead and copper.

The long-term intake of excessive lead in water, along with exposure from lead-based paint and contaminated soil and dust, can build up in blood to result in a concentration of this toxic metal to a harmful level. Lead is known to severely hamper physical and mental development in children, to raise blood pressure and interfere with hearing and, at a very high level, to cause kidney damage and mental retardation in adults. In reaction to these findings, the EPA's rule concerning lead in drinking water has become much more stringent, requiring some 79,000 public water supply systems to monitor lead levels at the tap and setting an action level of 15 ppb. The lead may be present in the water as ions, solid particles or be in the water as a soluble complex.

There are various methods to separate lead from aqueous solutions. The separation processes employed usually involve (1) ion exchange, (2) adsorption, (3) reverse osmosis, and (4) coagulation and precipitation.

Ion exchange is a process by which a given ion on an exchange solid is replaced by another ion in the solution, and is often used in processes for control of soluble metals, such as lead. For example, it is known that an ion exchange resin in calcium form can reduce lead in household drinking water, but the resin often lacks the ability to remove lead to the very low level required. Solid minerals can also be used as an ion exchange medium. For example, Takeuchi et al. ("A Study Equilibrium and Mass Transfer . . . ," Journal of Chemical Engineering of JAPAN, 21:1 pp. 98–100, 1988) discloses batch adsorption experiments using solid hydroxylapatite ($Ca_5(PO_4)_3OH$). Heavy metals, including lead, were removed from distilled water spiked with the metals by an equilibrium mass transfer of metals between the solid and aqueous phase. The removal of heavy metals was attributed to the ion exchange process in which the surface calcium was replaced by a divalent metal, e.g., $Pb^{2+}$.

Adsorption processes usually exploit the Weak van der Waals forces which are responsible for many reversible adsorptions of solutes to solid surfaces, or may involve more specific processes such as ion exchange and/or surface complexation. The weak physical adsorption can be easily reversed upon changes in conditions such as concentration of the solute, pH, temperature, or saturation of surface sites. Prior-art adsorption processes include using a granular activated carbon fixed-bed in a canister as a point-of-use device to remove lead from drinking water. Lead from a solution has also been adsorbed upon the surface of Vermiculite (a mica), Montmorillonite (a bentonite clay) and Goethite (an iron oxide).

Reverse osmosis has been used in point-of-use devices for removing lead from drinking water, as disclosed in Consumer Reports ("Water Treatment Devices," February 1993, pp. 79–82). Also disclosed are devices using distillation, and filtration.

Precipitation, where selected chemicals are applied to cause the solubility of solids to be exceeded, has been used to separate lead from the aqueous phase. Most particularly, carbonate or hydroxide precipitation has been proposed to remove heavy metals from solution. For example, calcium carbonate added to lead solutions has been used to remove lead as a precipitate. It has also been proposed to remove lead by coagulation and flocculation with alum at pH 8 to 9.

In U.S. Pat. No. 5,098,579 to Leigh et al. a method is proposed for continuously treating water by contacting the water with a metal salt which is sparingly soluble in water and has a very strong affinity to react with the ions to be removed to form an insoluble salt. The choice of the sparingly soluble salt is based upon the properties of the ion to be removed. For removal of $Pb^{2+}$ ions the sparingly soluble salt may be any of various carbonate salts, chromate salts, $Ca_3(PO_4)_2$, $CaSO_4$, or mixtures thereof.

The precipitation processes, such as Leigh et al., are directed mainly to industrial waste streams, and the like. Typically, prior-art precipitation treatments of water were not designed to remove lead to an extremely low value, such as to 15 ppb, and were not designed to function in a point-of-use home culinary system. An ideal point-of-use device for removing lead from drinking water should be capable or removing lead to a concentration of 15 ppb or lower. In addition, it should be relatively inexpensive, mechanically simple and not involve much maintenance. A device that is awkward to apply to existing drinking water systems in the household has a short service life or requires frequent recharging, involves handling of chemicals, particularly hazardous solids and liquids, or is expensive to purchase or maintain is not suitable. Such a device will likely not be used at all and will be eventually discarded or misused by the consumer. In addition, a point-of-use system should provide some indication when its lead removing ability is exhausted. For example, in systems using adsorbents, the like, there is usually no indication when the adsorbent is approaching saturation and becoming ineffective in removing lead sufficiently from the drinking water.

Copper is also known to be toxic at relatively low concentrations in drinking water. Copper in drinking water can occur particularly in areas where ground water supplies have been polluted by mining and smelting activity, and by corrosion in drinking water systems, such as in household piping, faucet and fixtures. Even though copper is a nutritional element, a high concentration of copper can cause gastrointestinal effects. Long term intake of a high concentration of copper in drinking water leads to intestinal, stomach distress and Wilson's disease. A high concentration of copper can also result in acute copper poisoning. Maessen, et al., *AWWA*, June 1985, 6, 73–80 discloses disorders caused by copper exposure, and it is reported that the death of a 14-month-old child was suspected as being caused by chronic copper poisoning. In reaction to these findings that long term exposure of excessive copper causes a variety of physiological and psychological disorders, the EPA has set an action level for copper of 1.3 ppm. As with lead, copper may also be resent in the water as soluble ions, copper-containing particle, or as a soluble complex.

Disinfection Byproducts

Chlorine is one of the most commonly used disinfectants for the destruction of harmful and pathogenic organisms that might endanger human health. Many of the organic compounds in water may react with the chlorine to form toxic compounds that cause adverse effects to humans after long-term intake. The most commonly seen disinfection byproducts (DBPs) in drinking water are trihalomethane (THM), trichloromethane (TCM), haloacetic acid, and dichloroacetate (DCA). Concentrations of TCM and DCA in drinking water have been reported to be as high as 600 ppb and 100 ppb, respectively. Human exposure to DBPs is rarely acute, but there are several chronic effects cause by exposure over many years. Some of the DBPs have been identified as carcinogens or potential carcinogens. Therefore, cancer has become a major concern to the general public because of chronic exposure to these compounds. The National Cancer Institute has identified TCM as a carcinogen, and researchers have reported DCA and other DBPs as carcinogens or potential carcinogens. DCA is potentially a potent inducer of hepatic tumors and liver cancer. Long-term intake of excessive trihalomethane has been shown to be potentially mutagenic and cytotoxic. As a result, the water treatment and supply industry is facing technical and fiscal hurdles as requirements are made to remove these disinfection byproducts from drinking water, and the maximum allowable concentrations are reduced. Recently, the EPA in the United States has approved a rule to reduce the maximum allowable THM concentration in treated water from 100 to 80 ppb.

Microorganisms

Drinking water, to be safe, should be free of microorganisms that cause health problems, which are most commonly Giardia and Cryptosporidium. Giardia is a protozoan parasite that infects the small intestine of man and many different species of mammals. The parasite is often found among children in kindergartens, nurseries, day care centers, and the like. Transmission is usually though water, so Giardia has become a significant waterborne disease. Since 1980, several outbreaks have occurred, many due to ineffective filtration of the water supply. While not conclusive, data from filtration plants indicates that removal of 75 to 80 percent of the incoming turbidity is necessary to insure removal of the giardia cysts (McFeters, *Drinking water Microbiology*, 1990, p.279).

Cryptosporidium is a protozoan parasite and can be found in drinking water. Some clinical results show that cryptosporidium will cause profuse watery diarrhea and fluid losses averaging three liters per day. Abdominal pain, nausea, vomiting, and fever may also be present. The symptoms will show on an average of three to six day after exposure. The common mode of transmission is through infected drinking water. Cryptosporidium occurs in water as a oocyst averaging 4 to 5 $\mu$m in diameter, much smaller than Giardia.

Because of their flexibility, harmful microorganisms can pass through a filter that is smaller than their diameter, but a filter of 1 $\mu$m or less, will filter out essentially all of the giardia and cryptosporidium present in the water. However, to be useful, the filter cannot become quickly clogged from other components in the water, such as precipitates, and the like.

OBJECTS OF THE INVENTION

It is an object of the invention to provide a point-of-use system for the removal of harmful pollutants from drinking water to safe concentrations, including lead, copper, organic substances, and microorganisms.

It is another object of the invention to provide a system for removing lead from drinking water that does not introduce high concentrations of strong-tasting ions, such as phosphates into the water.

It is another object of the invention to provide a device for treatment of water that is relatively inexpensive, easy to install, and easy to maintain.

Further objects of the invention will become evident in the description below.

SUMMARY OF THE INVENTION

An embodiment of the invention in an apparatus and method of removing heavy metals, chlorine, disinfection byproducts and other organic compounds, and microorganisms from culinary water. Culinary water from an outlet is directed through a mineral matrix comprising hydroxylapatite and a slightly soluble calcium carbonate, preferably also comprising an adsorbent such as activated carbon.

For use in culinary water, it is necessary to use a system that not only removes the toxic lead ions, but also does not introduce substances that are themselves toxic or will give the water a bad taste. For example, it has been found that $Ca_3(PO_4)_2$ can be used to reduce lead to below the EPA action level, but it leaves a concentration of phosphate ions that gives the water a strong taste. The phosphate ion concentration can be avoided by using carbonate salts instead of phosphate salts. However, it has been found that this increases the solubility of the lead ions to a concentration above the EPA action level. Chromate salts are also proposed for removal of lead from water, but chromate is very toxic and is not suitable for culinary water applications. Thus, practice of a prior-art precipitation system, such as the Leigh et al. system, for removing lead ions either will not remove lead to sufficiently low levels, or it will produce water with safe lead levels but that is bad tasting.

The present invention uses phosphate mineral that is generally regarded essentially insoluble, hydroxylapatite $(Ca_5(PO_4)_3OH)$ mixed with a slightly soluble calcium carbonate. Although, in most contexts, the solubility of HAP is negligible, the small amount of phosphate introduced in the solution is sufficient to precipitate lead and copper ions to concentrations well below the EPA action limits. This is obtained without introducing phosphate into the water sufficient to cause a bad taste. Generally, phosphate concentrations of 60 ppm are regarded as suitable but a perceptible taste may still be imparted. By practice of the present invention concentrations below 5 ppm are obtained, even as low as 3 ppm or below. Other phosphate minerals, such as Brushite ($CaHPO_4 \cdot 2H_2O$ ), can also reduce the lead concentrations, but this is at the expense of introducing undesirable concentrations of phosphate. In the present invention, use of hydroxylapatite allows for the reduction in lead concentrations while maintaining a suitably low phosphate concentration, below about 5 ppm.

The mineral matrix contains, in addition to hydroxylapatite, a slightly soluble calcium carbonate mineral. The minerals may be mixtures and contain other cation species, such as magnesium. The preferred composition of the mineral portion of the matrix is between 20 and 50 weight percent of the calcium phosphate mineral, hydroxylapatite, the remaining portion being the calcium carbonate mineral. This mixed composition suppresses the phosphate ion concentration, while still providing sufficient phosphate concentration for formation of insoluble lead salts.

The hydroxylapatite and carbonate minerals are described as being calcium minerals, but other suitable minerals that provide the same solubility of the carbonate and the phosphate ion would be suitable. For example, it is believed that magnesium salts analogous to the salts previously described would be suitable. The requirement is that phosphate and carbonate minerals are used in the matrix that the cation is common to both minerals. For example the mineral matrix may contain a very low soluble magnesium phosphate mineral with a solubility comparable to or less than hydroxylapatite and a slightly soluble magnesium carbonate mineral.

The carbonate minerals are slightly soluble and when dissolved in water form carbonate ions. By a mineral that is "slightly soluble in water" is meant a salt that provides an equilibrium concentration of carbonate ions of less than about 200 ppm. By "carbonate ions" is meant carbonate ions, as well as soluble conjugate forms, such as bicarbonate ions and carbonic acid ($CO_3^{2-}$, $HCO_3^-$, and $H_2CO_3$).

The copper in culinary water that is removed by the present process may be present in the form of suspending particles of copper and copper compounds, copper ions, and dissolved complexes.

The carbonate mineral in the matrix functions to suppress the concentration of phosphate ions, and to remove lead and copper by formation of lead carbonate and copper carbonate salts. Suitable carbonate minerals include, but are not limited to, calcium carbonate ($CaCO_3$), and calcium magnesium carbonate ($CaMg(CO_3)_2(s)$), and mixtures thereof, and may include, for example, magnesium carbonate ($MgCO_3$). In any case, any mineral in the matrix should not introduce other ions or substances that are toxic or may create a bad taste.

Lead in culinary water that is removed by the present process is often present in the form of suspended particles of lead and lead compounds, free lead ions, and dissolved hydrolyzed complexes, e.g., $Pb^{2+}$, $Pb(OH)^+$, $Pb(OH)_2^0$, $Pb(OH)_3^-$, or in the form of complexes of carbonate or other ligands, e.g., $PbCO_3^0$, $Pb(CO_3)_2^{2-}$, $PbCl^+$, $PbCl_2^0$, $PbCl_3^-$, or $PbSO_4^0$.

The mineral matrix may be contained in a single container or canister, or be divided into a plurality of canisters connected in parallel or series. The requirement is that the water be suitably directed. The matrix may be any suitable shape, for example, cubical, cylindrical, or tubular. For a tubular matrix, water may be directed into the tubular cavity of the matrix, then directed through the matrix to the outer circumference of the matrix from where it is directed to an outlet. The flow may also be reversed such that the water is introduced to the outer circumference, flows radially from the outer circumference of the matrix inwardly into the tubular cavity of the matrix.

The present system is preferably contemplated as a point-of-use system that is applied to a tap or faucet outlet as the culinary water outlet. This may be accomplished by providing a system that can be attached to a culinary water outlet. This can be in the form of a canister or canisters that attach to the faucet outlet by any suitable means. The apparatus of the invention may be constructed as a replacement to the screw-on filter screens usually found on faucets, by providing a threaded attachment at the inlet of the apparatus.

In an alternate embodiment of the invention, for treatment of drinking water that is not available from a faucet, the phosphate mineral, carbonate mineral, and optionally an adsorbent (such as activated carbon) are pressed or otherwise manufactured into a hard solid cake. Water is passed through the cake by gravity percolation or by pumping and is purified thereby.

The amounts of the minerals in the mineral matrix are chosen to provide sufficient contact time to produce solution with sufficient phosphate and carbonate concentration to remove lead and copper ions by precipitation, taking into account, for example, the flow rate the particle size of the mineral and the configuration of the mineral bed. Also, the operating life of the mineral matrix should be considered, as the matrix is gradually consumed by use. The apparatus can be constructed to provide the user a visual indication that the system is depleted by having a means that shows when the matrix is dissolved.

The matrix also act as a filter to remove suspended particles and to retain the lead and phosphate precipitates as they form, the matrix materials with suitable properties for filtering and water permeability are preferred. These properties include grain size and porosity. In addition, the physical dimensions of the matrix is such so as to provide a sufficiently thick filter bed for the sufficient contact with water and filtration of the solids and precipitates. The matrix may contain fillers or means for obtaining structural integrity of the matrix, as long as the lead and copper removal function of the matrix and the phosphate suppression function of the matrix are not significantly compromised.

A microfilter may also be used to retain copper and lead solid particles and precipitates. The microfilter can also function to remove microorganisms. To optimally remove precipitates and microorganisms, the filter pore size should be 1 micron, or less preferably 0.22 microns, or less.

The invention has also been found to remove to safe levels other undesirable dissolved metals in culinary water other than lead and copper.

The present invention differs from prior-art processes in that it is possible by practice of the invention to reduce the lead and copper content in the water to or well below the EPA action level (15 ppb for lead and 1.3 ppm for copper) but also to suppress phosphate ion content to improve the taste of water. The phosphate and carbonate ions enter the solution to form precipitates with lead in the form of carbonate-phosphate salts of lead that are more insoluble than lead carbonates alone. The presence of the phosphate ions in solution is critical to lower the final lead concentrations to sufficiently low levels. However, phosphate concentrations provided by soluble and slightly soluble minerals introduce phosphate at a concentration high enough to impart an unpleasant taste to the water. It has been found that using a mineral mixture of a slightly soluble carbonate and phosphate mineral that is regarded as essentially insoluble, hydroxylapatite, sufficient phosphate is introduced to form very insoluble lead/phosphate/carbonate precipitates without resulting in a concentration of phosphate that imparts a perceivably bad taste to the water. Surprisingly, a higher concentration phosphate is not required to suppress the solubility of lead in the solution. The hydroxylapatite mineral has sufficient solubility, although very slight, to introduce sufficient phosphate ions to the solution, which together with carbonate ions from the slightly soluble carbonate mineral, to reduce the solubility of lead to well below EPA target levels. Thus, by practice of the invention it is possible to suppress the phosphate concentration while simultaneously keeping the lead and copper concentrations low, providing good tasting water with safe lead and copper concentrations.

The present invention also is improved over known ion exchange or adsorption processes, since the mineral matrix itself undergoes dissolution and the constituent phosphate and carbonate ions react with lead cations to form a highly insoluble lead phosphate-carbonate precipitate. The carbonate and phosphate minerals in the matrix are consumable reactants rather than inert solids or surfaces for adsorption of lead ions. Accordingly, the apparatus of the invention will function to remove lead and copper from solution as long is there are both the phosphate hydroxylapatite and carbonate mineral present, thus providing a clear indication that the apparatus is functioning.

In a preferred embodiment of the invention, the mineral matrix of hydroxylapatite and slightly soluble carbonate mineral also comprises an adsorbent, such as activated carbon. Activated carbon is preferred, but any material with like adsorbent properties is contemplated for use in the invention. These include activated alumina, silica gel, molecular sieves, and the like. Activated carbon is preferred because of it wide availability and low cost. The activated carbon may be powdered or granular and be an activated charcoal, carbon, or the like. Preferably the activated carbon is present in an amount between about 40 and 60 wt. % of the total weight of the matrix.

The activated carbon is preferably used in the powdered form due to its good adsorption capacity. The use of activated carbon provides coarse filtration of particulate materials, including lead and copper particulates and precipitates from water. Use of the activated carbon also has a positive effect on the removal of lead and copper by retaining soluble of lead and copper and their complexes on the surfaces and in the pores of the activated carbon. The surface of the activated carbon carries negative charges, which assists in adsorbing free lead and copper ions. Use of activated carbon also assists in reduction of turbidity and hardness of the water. The activated carbon also assists in removal of chlorine, disinfection byproducts such as chloroform and dichloroacetate, and other organic compounds, such as p-nitrophenol.

DETAILED DESCRIPTION OF THE INVENTION

Figure 1:
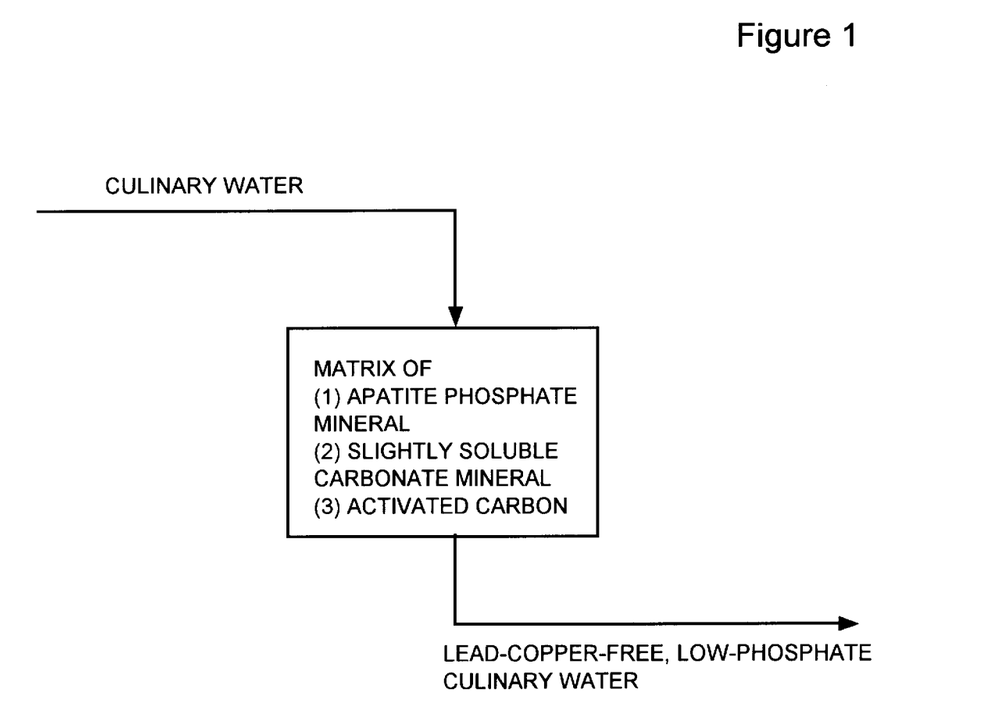
FIG. 1 is a flow diagram of the process of the invention.

Referring to FIG. 1, culinary water is passed through a matrix of hydroxylapatite, a slightly soluble carbonate material, and optionally and adsorbent such as activated carbon. A microfilter, preferably 1 micron or less, may also be provided to screen out precipitates formed in the mineral matrix and remove microorganisms.

Figure 2:
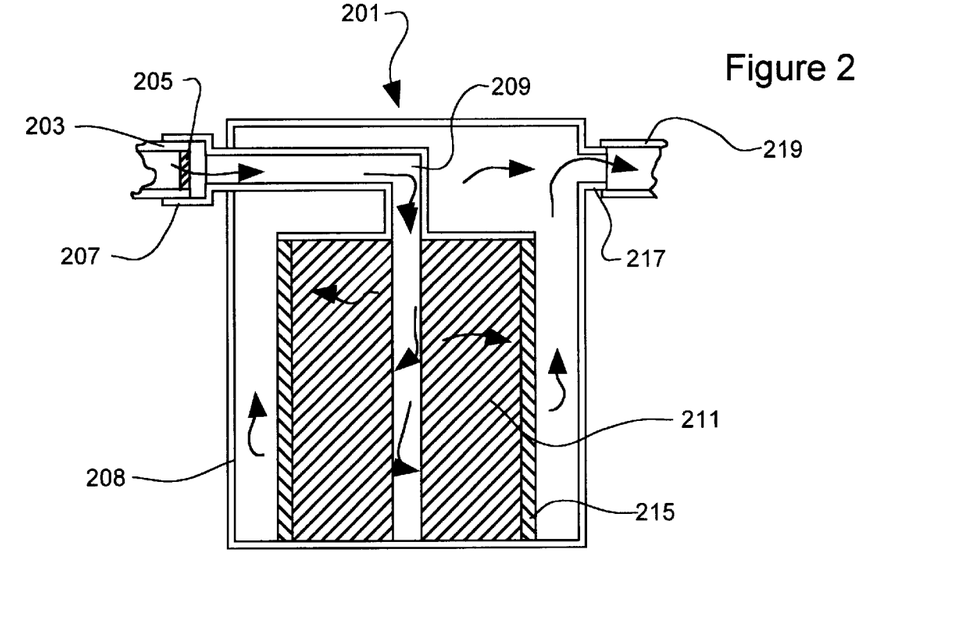
FIG. 2 is a schematic cross-sectional view of an apparatus of the invention.

Referring to FIG. 2, which shows an apparatus 201 of the invention suitable for attachment to a culinary water source 203, such as a faucet. The culinary water source 203 is preferably a culinary water faucet, but may be any suitable means for delivering water, such as a water storage tank with a gravity fed outlet, or any other pressurized or gravity fed water system. A screen or prefilter 205 may be optionally provided, disposed either in the faucet 203, or in the filter apparatus 201 itself. Water from the faucet flows through a water inlet 207 into a containment 208 for the apparatus 201. The water inlet 207 is adapted to attach to the faucet by means of, for example, a screw fitting, a press fitting, a bayonet fitting, or the like. The containment is adapted to contain the elements for the apparatus 201, and provide a means for directing the water in, through and out of the apparatus 201. (The water flow is indicated by the flow arrows.) A conduit 209 conveys the water from the inlet 207 to a mineral matrix 211 comprising hydroxylapatite, calcium carbonate, and activated carbon. The matrix 211 is tubular in shape, and water may is directed into the tubular interior cavity 213 of the matrix, and then directed through the matrix to the outer circumference of the matrix. Surrounding the outer circumference of the matrix, is a microfilter 215. After passing through the microfilter 215, the water is directed through the containment to an outlet 217. The outlet may be optionally adapted for attachment to an additional fixture 219, such as a water storage or drinking container, additional filters or treatment systems, a hose or tube for conveying the water, or the like.

Figure 3:
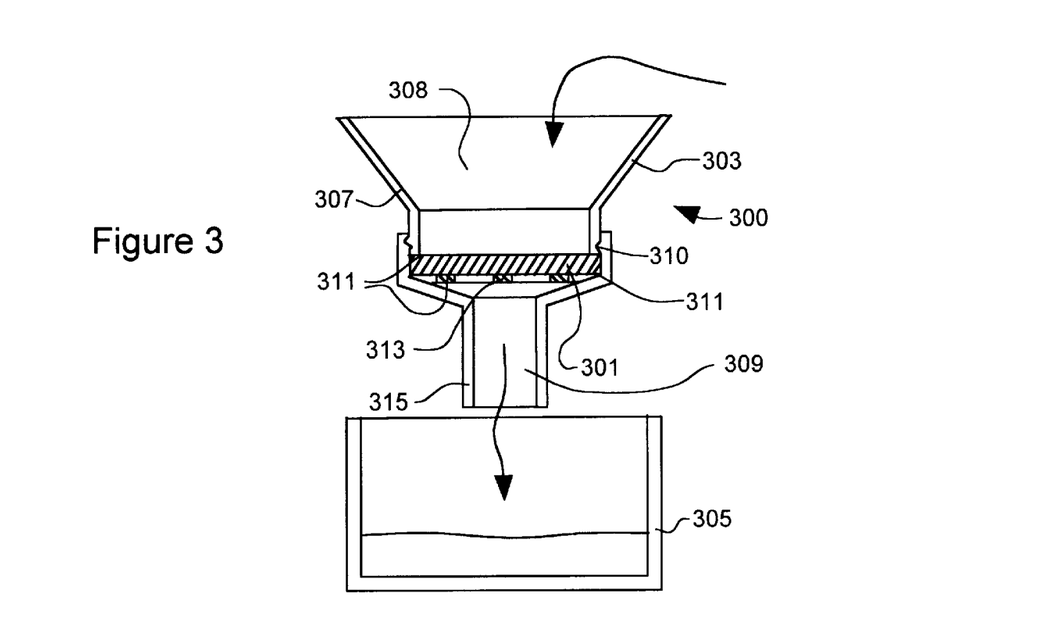
FIG. 3 is a schematic cross-sectional view of another apparatus of the invention.

Referring to FIG. 3, which shows a schematic cross-section of an alternate embodiment of the invention, a mineral matrix 301 is disposed within a water funnel 303 so that water poured into the funnel can percolate through the mineral matrix 301, and flow into a container 305 (as shown by the flow arrows). The funnel in a two piece design with an upper portion 307 with a flared inlet 308 attached to the lower portion 309 by a suitable thread fittings, pressure fit, or other suitable means 310. The mineral matrix 301 is placed in the lower portion 309, and the upper portion 307 is attached thereto, securing the mineral matrix 301 in place between surfaces 311 that abut the mineral matrix 301. A screen 313 in the lower portion may be provided to support the mineral matrix and provide an abutting surface 311. The outlet 315 of the lower portion, may optionally be adapted for attachment to a water storage/drinking container, or the inlet of a hand pump, which can be used to assist flow of water through the matrix 301.

EXAMPLES

In Examples I to XIV below, a mineral mixture was placed in a canister. The minerals were present as shrinking consumable bed. Where used, activated was mixed with the minerals before placement in the canister. The hydroxyapatite was from Aldrich, Merck Index 11, 3449 R&S(3). The calcium carbonate was from Fisher Scientific, CAS Reg 471-34-1. Other sources and grades and minerals are also suitable. The highest grades are preferred. The ion and metal concentrations and the pH measurements were made using conventional analytical techniques.

Example I

In this example the removal of copper from solution made from tap water and from distilled water is illustrated. Particularly the effect of initial pH on final copper concentration is illustrated. The mineral mixture was 24 grams of calcium carbonate ($CaCO_3$), and 6 grams of hydroxylapatite.

Samples were taken after the water solution passed through the filter for 5 minutes at a flow rate of 130 ml/min. The pH values for the tap water and distilled water were adjusted by 5M solutions of NaOH and $HNO_3$. The initial conditions of the water samples are summarized in Table I-1. The results are summarized below in Tables I-2 and I-3.

TABLE I-1

Initial Conditions

| | |
|---|---|
| Lead Conc. (ppb) | 1000 |
| Cu Conc. (ppm) | 5 |
| Ca Conc. (tap water - ppm) | 61 |
| P Conc. (ppm) | 0 |
| pH (tap water) | 7.4 |
| Turbidity (tap water NTU) | 0.88 |
| Turbidity (distilled water NTU) | 0 |

TABLE I-2

Copper Removal from Tap Water

| Initial pH | Initial Cu Conc. (ppm) | Final pH | Final Cu Conc. (ppm) | Turbidity (NTU) |
|---|---|---|---|---|
| 6 | 5 | 6.35 | 1.521 | 0.08 |
| 6.5 | 5 | 6.84 | 0.978 | 0.08 |
| 7 | 5 | 7.23 | 0.422 | 0.09 |
| 7.4 | 5 | 7.5 | 0.156 | 0.15 |
| 8 | 5 | 8.15 | 0 | 0.16 |
| 8.5 | 5 | 8.51 | 0 | 0.14 |

TABLE I-3

Copper Removal from Distilled Water

| Initial pH | Initial Cu Conc. (ppm) | Final pH | Final Cu Conc. (ppm) | Turbidity (NTU) |
|---|---|---|---|---|
| 6 | 5 | 6.83 | 0.35 | 0.07 |
| 6.5 | 5 | 7.71 | 0.17 | 0.09 |
| 7 | 5 | 8.01 | 0.038 | 0.08 |
| 7.4 | 5 | 8.11 | 0.025 | 0.11 |
| 8 | 5 | 8.13 | 0 | 0.09 |
| 8.5 | 5 | 8.52 | 0 | 0.09 |

The result shows that the removal of copper ions is improved with a increasing pH. In all but one test, the copper concentrations were below the EPA action level (1.3 ppm). The turbidity was also significantly reduced, showing a potential reduction in suspended solids and microorganisms.

Example II

In this example the removal of lead from solution made from tap water and from distilled water is illustrated. In particular the effect of initial pH on the final concentration of lead is illustrated. The mineral mixture was 24 grams of calcium carbonate ($CaCO_3$), and 6 grams of hydroxylapatite. Samples were taken after the water solution passed through the filter for 5 minutes at a flow rate of 130 ml/min. The initial conditions of the tap water and distilled water are the same as in Example I. The results are summarized below in Tables II-1 and II-2.

TABLE II-1

Removal of Lead from Water

| Initial pH | Initial Pb Conc. (ppm) | Final pH | Final Pb Conc. (ppm) | Turbidity (NTU) |
|---|---|---|---|---|
| 6 | 1000 | 6.35 | 2.9 | 0.08 |
| 6.5 | 1000 | 6.84 | 0.4 | 0.08 |
| 7 | 1000 | 7.23 | 0.2 | 0.09 |
| 7.4 | 1000 | 7.5 | 0.3 | 0.15 |
| 8 | 1000 | 8.15 | 0.4 | 0.16 |
| 8.5 | 1000 | 8.51 | 3.7 | 0.14 |

TABLE II-2

Removal of Lead of Distilled Water

| Initial pH | Initial Pb Conc. (ppm) | Final pH | Final Pb Conc. (ppm) | Turbidity (NTU) |
|---|---|---|---|---|
| 6 | 1000 | 6.71 | 0.1 | 0.07 |
| 6.5 | 1000 | 7.83 | 0.1 | 0.07 |
| 7 | 1000 | 8.01 | 0 | 0.08 |
| 7.4 | 1000 | 8.11 | 0.2 | 0.11 |
| 8 | 1000 | 8.13 | 0.2 | 0.09 |
| 8.5 | 1000 | 8.52 | 0.3 | 0.09 |

The results show that lead was reduced well below the EPA action level at all pH values.

Example III

In this example, lead and copper were removed from solutions of various pH values to demonstrate the effect of pH on final concentration. The example also illustrates the use of a post-microfilter (0.22 μm) to remove precipitated solids that are still suspended in the water stream after treatment in the mineral bed.

The solutions were prepared from tap water as in Example I. The composition of the mineral mixture was 24 g calcium carbonate, and 6 grams HAP. The solution to be treated was passed through a pre-microfilter of a pore size of 0.22 μm and the solution after treatment by the mineral mixture was passed again through a similar post-filter. The treated solution was analyzed before and after passage through the post-filter. The flow rate of the solution was 130 ml/min. The results are summarized in Table III.

TABLE III

Pb and Cu Removal

| Initial pH | Final pH | Initial Pb (ppb) | Final Pb w/o post filter (ppb) | Final Pb with post filter (ppb) | Initial Cu (ppm) | Final Cu w/o post filter (ppb) | Final Cu with post filter (ppb) |
|---|---|---|---|---|---|---|---|
| 6 | 6.4 | 1000 | 4.8 | 1.8 | 5 | 1.648 | 1.478 |
| 6.5 | 6.9 | 1000 | 1.7 | 1.2 | 5 | 0.755 | 0.191 |
| 7 | 7.2 | 1000 | 0.9 | 0.3 | 5 | 0.334 | 0.038 |
| 7.4 | 7.5 | 1000 | 0.3 | 0.2 | 5 | 0.158 | 0.029 |
| 8 | 8.2 | 1000 | 0.2 | 0 | 5 | 0 | 0 |
| 8.5 | 8.5 | 1000 | 0.1 | 0 | 5 | 0 | 0 |

The results show that both the final lead and copper concentrations were lowered by use of the post filter. The reduction is believed due to the retention by the filter of lead and copper precipitates formed in the mineral matrix.

Example IV

In this example, lead and copper were removed from solutions at various temperatures to demonstrate the effect of temperature on final lead and copper concentrations. The solutions were prepared from tap water as in Example I, and the initial conditions were the same except the calcium concentration was 56 ppm. The composition of the mineral mixture was 24 g calcium carbonate, and 6 grams HAP. The solutions to be treated were first passed through a 0.22 μm microfilter and after treatment by the mineral mixture were passed again through a similar post-filter. The flow rate of the solution was 450 ml/min, and the initial pH was 7.5. The final lead, copper and phosphate (as P) were measured. The results are summarized below in Table IV.

TABLE IV

Lead and Copper Removal/Temperature

| Temp (° C.) | Final Cu w/o post filter (ppm) | Final Cu with post filter (ppm) | Final Pb w/o post filter (ppb) | Final Pb with post filter (ppb) | Final pH | Final Ca (ppm) | Final P (ppm) |
|---|---|---|---|---|---|---|---|
| 10 | 0.205 | 0.157 | 0.8 | 0.7 | 7.57 | 60 | <2 |
| 20 | 0.175 | 0.153 | 0.8 | 0.7 | 7.5 | 57 | <2 |
| 40 | 0.163 | 0.14 | 0.7 | 0.4 | 7.52 | 54 | <2 |
| 50 | 0.046 | 0.046 | 0.6 | 0.3 | 7.5 | 53 | <2 |
| 60 | 0.046 | 0.046 | 0.2 | 0.1 | 7.48 | 49 | <2 |

The results show a general increase removal efficiency for both lead and copper with increasing temperature. However, even in cool water the lead and copper concentrations are well below the EPA action levels. The phosphate concentration are also quite low, not withstanding that the phosphate concentration is high enough to precipitate copper and lead.

Example V

In this example, solutions were treated with mineral mixture and with and without a micro filter at various temperatures to show the effect of temperature and a post-filter on final copper concentration. The solutions were prepared from tap water as in Example I, and the initial conditions were the same except the calcium concentration was 56 ppm. The composition of the mineral mixture was 24 g calcium carbonate, and 6 grams HAP. The solution to be treated was passed through a pre-microfilter of a pore size of 0.22 μm and the solution after treatment by the mineral mixture was passed again through a similar post-filter and the solution analyzed for calcium, lead and copper and pH before and after the post-filter. The flow rate of the solution was 450 ml/min, and the initial pH was adjusted to 6.5. The results are summarized below in Table V.

TABLE V

Copper and Lead Removal vs. Temperature and Post-filter.

| Temp (° C.) | Final Cu w/o post-filter (ppm) | Final Cu with post-filter (ppm) | Final Pb w/o post-filter (ppb) | Final Pb w/o post-filter (ppb) | Final pH | Final Ca (ppm) |
|---|---|---|---|---|---|---|
| 10 | 0.985 | 0.946 | 0.9 | 0.7 | 6.71 | 61 |
| 20 | 0.978 | 0.931 | 0.8 | 0.7 | 6.72 | 58 |
| 40 | 0.837 | 0.767 | 0.8 | 0.5 | 6.72 | 57 |
| 50 | 0.678 | 0.674 | 0.6 | 0.3 | 6.71 | 57 |
| 60 | 0.581 | 0.534 | 0.3 | 0.1 | 6.65 | 57 |

The results show very low levels of lead, and levels of copper well below the EPA action level.

Example VI

In this example, solutions were treated at various flow rates through a mineral mixture to show the effect flow rate on final lead and copper concentrations. The solutions were prepared from tap water (Ca=63 ppm, P=0, Pb=0, Cu=0, pH 7.4) by adding copper and lead stock solutions to achieve an initial concentration of 1000 ppb of Pb, and 5 ppm of Cu. The composition of the mineral mixture was 24 g calcium carbonate, and 6 grams HAP. The initial pH was 7.4. The final concentrations of lead, copper, calcium and phosphate (as P) were measured. The results are summarized below in Table VI.

TABLE VI

Lead and Copper Removal/Flow rate

| Flow Rate (ml/min) | Final pH | Final Cu (ppm) | Final Ca (ppm) | Final P (ppm) | Final Pb (ppb) |
|---|---|---|---|---|---|
| 100 | 7.58 | 0.156 | 66 | 1.78 | 0.3 |
| 200 | 7.55 | 0.159 | 66 | 1.77 | 0.7 |
| 300 | 7.53 | 0.161 | 66 | 1.68 | 0.8 |
| 400 | 7.52 | 0.174 | 65.5 | 1.98 | 0.8 |
| 500 | 7.49 | 0.181 | 65.5 | 1.87 | 2.8 |
| 600 | 7.48 | 0.238 | 66 | 2.05 | 0.5 |
| 700 | 7.48 | 0.308 | 66 | 1.45 | 0.9 |
| 800 | 7.48 | 0.412 | 66 | 1.33 | 3.7 |
| 900 | 7.49 | 0.455 | 65.5 | 1.25 | 3.8 |
| 1000 | 7.48 | 0.515 | 66 | 1.36 | 3.9 |
| 1200 | 7.49 | 0.468 | 64.5 | 1.31 | 3.5 |
| 1500 | 7.48 | 0.509 | 66 | 1.29 | 3.6 |

The results show suitable removal of lead and copper at all flow rates. The phosphates concentrations are also very low, and there was only a small increase in calcium concentration.

Example VII

In this example, solutions were treated with mineral mixture and the copper and lead removal was measured over time to determine the life of the mineral mixture. The solutions were prepared from tap water as in Example VI by adding lead and copper stock solutions to achieve an initial concentration of 1000 ppb of Pb, and 5 ppm of Cu. The composition of the mineral mixture was 24 g calcium carbonate, and 6 grams HAP. The initial pH was 7.4. The results, showing final pH, calcium, phosphorous, copper, and lead are summarized below in Table VII. The initial flow rate was set at 1000 ml/min and was maintained at about the rate over the lifetime of the cartridge.

TABLE VII

Copper and Lead Concentration vs. Flow Volume

| Total Volume (Liters) | pH | Final Ca (ppm) | Final P (ppm) | Final Cu (ppm) | Final Pb (ppb) |
|---|---|---|---|---|---|
| 500 | 7.58 | 65 | 2.548 | 0.125 | 1.1 |
| 1000 | 7.57 | 65 | trace | 0.2 | 1.3 |
| 1500 | 7.55 | 65.5 | trace | 0.25 | 1.2 |
| 2000 | 7.56 | 64.5 | trace | 0.475 | 3.8 |
| 2500 | 7.54 | 64 | trace | 0.75 | 4.1 |
| 3000 | 7.53 | 64 | trace | 0.875 | 4.8 |
| 3500 | 7.52 | 65.5 | trace | 0.92 | 3.9 |
| 4000 | 7.51 | 64 | trace | 0.987 | 11.2 |
| 4500 | 7.49 | 64 | trace | 1.05 | 13.2 |
| 5000 | 7.48 | 63.5 | trace | 0.225 | 20.8 |
| 5500 | 7.46 | 64 | trace | 2.375 | 34.1 |
| 6000 | 7.46 | 63.5 | trace | 1.457 | 38.2 |
| 6500 | 7.46 | 64 | trace | 2.055 | 40.2 |
| 7000 | 7.45 | 64 | trace | 2.894 | 40.8 |

From the results, a mineral mixture of the this size would last for about 4500 liters before the EPA limit of 15 ppb was exceeded. For a typical household consuming 10 gallons a day, this the mineral mixture would last about 120 days. It was not necessary to install a prefilter to prevent trace amount of impurities clogging the filter as shown by the absence of any decrease of flow rate over the lifetime of the filter.

Example VIII

Tests were run essentially as in Example VII, except with a different composition and amount of the mineral matrix. The solutions were prepared from tap water as in Example VI by adding lead and copper stock solutions to achieve an initial concentration of 1000 ppb of Pb, and 5 ppm of Cu. The composition of the mineral mixture was 12 g calcium carbonate, 3 grams HAP, and 15 grams activated carbon. The initial pH was 7.5. The results, showing final pH, calcium, phosphorous, copper, and lead are summarized below in Table VIII. The initial flow rate was set at between 1000 to 1020 ml/min and was maintained between these rates over the lifetime of the cartridge. The initial concentrations of calcium and phosphate was 61.3 ppm, and 0 ppm, respectively

TABLE VIII

Copper and Lead Concentration vs. Flow Volume

| Total Volume (Liters) | pH | Final Ca (ppm) | Final P (ppm) | Final Cu (ppm) | Final Pb (ppb) |
|---|---|---|---|---|---|
| 500 | 7.6 | 60.2 | 1.97 | 0.11 | 0.5 |
| 1000 | 7.61 | 60.5 | 1.84 | 0.16 | 0.4 |
| 1500 | 7.59 | 60.8 | 1.95 | 0.31 | 1.7 |
| 2000 | 7.6 | 60 | 1.75 | 0.53 | 5.9 |
| 2500 | 7.58 | 60.4 | 1.42 | 0.74 | 9.1 |
| 3000 | 7.57 | 60 | 1.25 | 0.93 | 15.2 |
| 3500 | 7.57 | 60 | 1.27 | 1.45 | 19.2 |
| 4000 | 7.58 | 59.5 | 1.26 | 1.79 | 30.2 |
| 4500 | 7.56 | 59.4 | 1.21 | 2.01 | 47.3 |

From the results, a mineral mixture of the this size would last for slightly less than about 3000 liters before the EPA limit of 15 ppb was exceeded. It was not necessary to install a prefilter to prevent trace amount of impurities clogging the filter as shown by the absence of any decrease of flow rate over the lifetime of the filter.

Example IX

Tests were run essentially as in Example VII, except with a different composition and amount of the mineral matrix. The solutions were prepared from tap water as in Example VI by adding lead and copper stock solutions to achieve an initial concentration of 1000 ppb of Pb, and 5 ppm of Cu. The composition of the mineral mixture was 9 g calcium carbonate, 6 grams HAP, and 15 grams activated carbon. The initial pH was 7.5. The results, showing final pH, calcium, phosphorous, copper, and lead are summarized below in Table IX. The initial flow rate was set at between 1000 to 1020 ml/min and was maintained between these rates over the lifetime of the cartridge. The initial concentrations of calcium and phosphate was 61.3 ppm, and 0 ppm, respectively

TABLE IX

Copper and Lead Concentration vs. Flow Volume

| Total Volume (Liters) | pH | Final Ca (ppm) | Final P (ppm) | Final Cu (ppm) | Final Pb (ppb) |
|---|---|---|---|---|---|
| 500 | 7.6 | 60 | 1.95 | 0.12 | 0.3 |
| 1000 | 7.6 | 59.7 | 1.92 | 0.14 | 0.4 |
| 1500 | 7.59 | 59.6 | 1.87 | 0.33 | 1.6 |
| 2000 | 7.6 | 59.5 | 1.83 | 0.49 | 3.7 |
| 2500 | 7.58 | 59.5 | 1.54 | 0.79 | 7.2 |
| 3000 | 7.58 | 59 | 1.45 | 1.12 | 10.5 |
| 3500 | 7.57 | 59.4 | 1.32 | 1.38 | 14.7 |
| 4000 | 7.58 | 59.2 | 1.31 | 1.84 | 23.5 |
| 4500 | 7.57 | 59 | 1.24 | 2.11 | 38.5 |

From the results, a mineral mixture of the this size would last for about 3500 liters before the EPA limit of 15 ppb was exceeded. It was not necessary to install a prefilter to prevent trace amount of impurities clogging the filter as shown by the absence of any decrease of flow rate over the lifetime of the filter.

Example X

In this example, copper was removed from solutions at various pH values and flow rates to demonstrate the effect of flow rates and pH on copper and lead removal. Activated carbon was also mixed into the mineral bed. The solution were prepared from tap water (Ca=59 ppm, P=0 ppm, Pb=0 ppb, Cu=0 ppm, pH=7.61) by adding copper and lead stock solutions to achieve an initial concentration of 1000 ppb of Pb, and 5 ppm of Cu. The composition of the mineral mixture was 15 g activated carbon powder, 12 g calcium carbonate, and 3 grams HAP. The results are summarized below in Table IX.

TABLE X

Lead and Copper Removal/pH

| Flow Rate (ml/min) | Initial pH | Final pH | Final Cu (ppm) | Final Ca (ppm) | Final P (ppm) | Final Pb (ppb) |
|---|---|---|---|---|---|---|
| 1000 | 7.4 | 7.51 | 0.03 | 61.9 | 1.71 | 0.2 |
| 1000 | 7 | 7.14 | 0.21 | 62.2 | 1.54 | 0.3 |
| 1000 | 6.5 | 6.74 | 0.93 | 61.9 | 0.98 | 4.2 |
| 500 | 7.4 | 7.58 | 0.02 | 61.9 | 2.62 | 0.1 |
| 500 | 7 | 7.17 | 0.22 | 62.1 | 1.29 | 0.1 |
| 500 | 6.5 | 6.75 | 0.96 | 62.2 | 0.98 | 3.8 |
| 130 | 7.4 | 7.61 | 0 | 61.5 | 2.45 | 0.1 |

TABLE X-continued

Lead and Copper Removal/pH

| Flow Rate (ml/min) | Initial pH | Final pH | Final Cu (ppm) | Final Ca (ppm) | Final P (ppm) | Final Pb (ppb) |
|---|---|---|---|---|---|---|
| 130 | 7 | 7.18 | 0.18 | 63.5 | 1.48 | 0.1 |
| 130 | 6.5 | 6.89 | 0.93 | 62.5 | 1.04 | 3.3 |

The data show that copper and lead removals were good for all pH values and flow rates. The final phosphate concentration was also very low.

Example XI

In this example, copper and lead were removed from solutions at various solution flow rates and pH values to demonstrate the effect of flow rate and pH on copper and lead removal. The solutions were prepared from tap water (Ca=59 ppm, P=ppm, Cu=0 ppm, pH=7.61)) with initial concentration of 1000 ppb of Pb, and 5 ppm of Cu. The composition of the mineral mixture was 15 g activated carbon, 12 g calcium carbonate, and 3 grams HAP. The results are summarized below in Table XI.

TABLE XI

Copper and Lead Removal/Flow Rate and pH

| Flow Rate (ml/min) | Initial pH | Final pH | Final Cu (ppm) | Final Ca (ppm) | Final P (ppm) | Final Pb (ppb) |
|---|---|---|---|---|---|---|
| 1000 | 7.4 | 7.51 | 0.03 | 61.9 | 1.71 | 0.5 |
| 500 | 7.4 | 7.58 | 0.02 | 61.9 | 2.62 | 0.3 |
| 130 | 7.4 | 7.61 | 0 | 61.5 | 2.45 | 0.3 |
| 1000 | 7.0 | 7.14 | 0.21 | 62.2 | 1.54 | 1.1 |
| 500 | 7.0 | 7.17 | 0.22 | 62.1 | 1.29 | 0.9 |
| 130 | 7.0 | 7.18 | 0.18 | 63.5 | 1.48 | 0.7 |
| 1000 | 6.5 | 6.74 | 0.93 | 61.9 | 0.98 | 7.4 |
| 500 | 6.5 | 6.75 | 0.96 | 62.2 | 0.98 | 6.8 |
| 130 | 6.5 | 6.89 | 0.93 | 62.5 | 1.04 | 6.7 |

As seen from the results, the final lead and copper concentration do not exceed the EPA mandated levels for drinking water (15 ppb and 1.3 ppm, respectively). This example and Example VIII show that pH as the predominant parameter effecting removal efficiency.

Example XII

In this example, copper, lead, and p-nitrophenol (4-NP) were removed from solutions. The ability of the system to remove organic compounds is illustrated. The solutions were prepared from tap water (Ca=55 ppm, Cu=0 ppm, Pb=0 ppb, P=0 ppm, pH=7.4) by adding copper and lead stock solutions to achieve an initial concentration of 1000 ppb of Pb, and 5 ppm of Cu. 4-NP was also added to a concentration of $5 \times 10^{-4}$ M. The composition of the mineral mixture was 15 g activated carbon, 12 g calcium carbonate, and 3 grams HAP. The results are summarized below in Table XII.

TABLE XII

Lead and Copper Removal/4-NP

| Flow Rate (ml/min) | Final pH | Final Cu (ppm) | Final Ca (ppm) | Final P (ppm) | Final 4-NP ($MX10^{-5}$) | 4-NP Removed (%) | Final Pb (ppb) |
|---|---|---|---|---|---|---|---|
| 1500 | 7.55 | 0.269 | 55.9 | 1.81 | 3.75 | 92.5 | 3.9 |
| 1000 | 7.52 | 0.156 | 59.1 | 1.72 | 3.33 | 93.3 | 0.8 |
| 500 | 7.55 | 0.09 | 60.6 | 1.98 | 3.65 | 92.7 | 0.3 |
| 130 | 7.61 | 0.07 | 60.5 | 2.21 | 3.11 | 93.8 | 0.2 |

The results show that heavy metals and organic compounds (more than 90% 4-NP) can be removed at the same time without significant impact upon lead and copper removal.

Example XIII

In this example, copper and lead were removed from solutions with and without activated carbon in mineral mixture to demonstrate the effect of the activated carbon on copper and lead removal. The solutions were prepared from tap water (Ca=58 ppm, P=0 ppm, Cu=0 ppm, Pb=0 ppb, pH=7.4) by adding copper and lead stock solutions to achieve an initial concentration of 1000 ppb of Pb, and 5 ppm of Cu. The composition of the mineral mixture was 12 ppm calcium carbonate, and 3 grams HAP with 15 grams activated carbon in those tests with activated carbon. The results are summarized below in Tables XIII-1 and XIII-2.

TABLE XIII-1

Copper and Lead Removal With Activated Carbon

| Flow Rate (ml/min) | Final pH | Final Cu (ppm) | Final Pb (ppb) | Final Ca (ppm) | Final P (ppm) |
|---|---|---|---|---|---|
| 1500 | 7.52 | 0.05 | 0.9 | 60.5 | 1.39 |
| 1000 | 7.51 | 0.03 | 0.5 | 61.9 | 1.47 |
| 500 | 7.58 | 0.02 | 0.3 | 61.9 | 1.21 |
| 130 | 7.61 | 0 | 0.3 | 61.5 | 1.45 |

TABLE XIII-2

Copper and Lead Removal Without Activated Carbon

| Flow Rate (ml/min) | Final pH | Final Cu (ppm) | Final Pb (ppb) | Final Ca (ppm) | Final P (ppm) |
|---|---|---|---|---|---|
| 1500 | 7.47 | 0.557 | 4.1 | 64.5 | 1.56 |
| 1000 | 7.48 | 0.515 | 3.9 | 64 | 1.36 |
| 500 | 7.49 | 0.181 | 2.8 | 64.5 | 1.87 |
| 130 | 7.55 | 0.159 | 0.4 | 65 | 1.82 |

The results show that the combination of the calcium carbonate/hydroxylapatite mineral bed combined with activated carbon has a synergistic effect in removing both lead and copper.

Example XIV

This example shows the removal of chlorine from tap water simultaneously with the removal of copper and lead. The solutions were prepared from tap water (Ca=61.5 ppm, P=0 ppm, Cu=0 ppm, Pb=0 ppb, Cl=0.55~0.65 mg/L) by adding copper and lead stock solutions to achieve an initial concentration of 1000 ppb of Pb, and 5 ppm of Cu. 1 ppm of chlorine was added using a commercially available sodium hypochlorite solution (NaOCl; Aldrich, minimum available chlorine 5%) to give a total concentration of chlorine of about 1.6±0.05 ppm. The composition of the mineral mixture was 12 grams calcium carbonate, 3 grams HAP, and 15 grams powdered activated carbon. The flow rate through the filter was 1500 ml/min. The results are summarized below in Table XIV.

TABLE XIV

Removal of Chlorine

| Initial pH | Chlorine (ppm) | Final Pb (ppb) | Final Cu (ppm) | Final Ca (ppm) | Final P (ppm) | pH |
|---|---|---|---|---|---|---|
| 6 | 0.1 | 9.4 | 1.97 | 65 | 1.45 | 6.37 |
| 6.5 | 0.12 | 1.7 | 0.98 | 64 | 1.65 | 6.69 |
| 7 | 0.13 | 0.6 | 0.35 | 63.5 | 1.57 | 7.12 |
| 7.4 | 0.13 | 0.4 | 0.24 | 63.5 | 1.85 | 7.52 |
| 8 | 0.14 | 0.3 | 0 | 63 | 1.87 | 8.15 |
| 8.5 | 0.16 | 0.5 | 0 | 63 | 1.79 | 8.56 |

The results show that the system can remove over 90% of chlorine in tap water.

Example XV

This example shows the removal of chloroform from tap water simultaneously with the removal of copper and lead. The solutions were prepared from tap water (Ca=61 ppm, P=0 ppm, Cu=0 ppm, Pb=0 ppb, $CHCl_3$=0, pH=7.51) by adding chloroform to concentrations of 1000 ppb, 600 ppb, and 300 ppb, and lead and copper concentrations of 1000 ppb of Pb, 5 ppm of Cu. The composition of the mineral mixture was 12 grams calcium carbonate, 3 grams HAP, and 15 grams powdered activated carbon. The results at various flow rates are summarized below in Table XV.

TABLE XV

Removal of Chloroform

| Flow Rate (ml/min) | Initial Conc. (ppb) | Final Conc. (ppb) | Initial Conc. (ppb) | Final Conc. (ppb) | Initial Conc. (ppb) | Final Conc. (ppb) |
|---|---|---|---|---|---|---|
| 100 | 1000 | 0 | 600 | 0 | 300 | 0 |
| 200 | 1000 | 0 | 600 | 1 | 300 | 0 |
| 500 | 1000 | 3 | 600 | 3 | 300 | 2.5 |
| 700 | 1000 | 40 | 600 | 9 | 300 | 7 |
| 1000 | 1000 | 114 | 600 | 9.5 | 300 | 7 |

This example illustrates the effective removal of chloroform, even with an extremely high influent concentration (1000 ppb) of chloroform. At flow rates of 700 ml/min and less the chloroform concentrations are within allowable limits at all of the chloroform concentrations. This is accomplished using a matrix of hydroxylapatite, calcium carbonate, and activated carbon.

Example XVI

This example shows the removal of dichloroacetate (DCA) from tap water simultaneously with the removal of copper and lead. The solutions were prepared from tap water (Ca=61 ppm, P=0 ppm, Cu=0 ppm, Pb=0 ppb, $CHCl_3$=0, pH=7.51) with addition of DCA, lead and copper to achieve concentrations of DCA of 200 ppb, and 100 ppb, and concentrations of 1000 ppb of Pb, and 5 ppm of Cu. The composition of the mineral mixture was 12 grams calcium carbonate, 3 grams HAP, and 15 grams powdered activated carbon. The results at various flow rates are summarized below in Table XVI.

TABLE XVI

Removal of Dichloroacetate

| Flow Rate (ml/min) | Initial Conc. (ppb) | Final Conc. (ppb) | Initial Conc. (ppb) | Final Conc. (ppb) |
|---|---|---|---|---|
| 100 | 200 | 2.5 | 100 | 2 |
| 200 | 200 | 4.3 | 100 | 2 |
| 500 | 200 | 7 | 100 | 4 |
| 700 | 200 | 14.5 | 100 | 6.4 |
| 1000 | 200 | 22 | 100 | 9.8 |

This examples shows that more than about 90% of the DCA was removed, and illustrates the effective removal of DCE to below the EPA standard (80 ppb of total halomethanes) using a matrix of hydroxylapatite, calcium carbonate, and activated carbon.

Example XVII

Samples of drinking water from various locations were spiked with stock solutions to give an initial concentration of lead and copper of 1000 ppb, and 5 ppm, respectively. The pH was adjusted to the initial pH. The water samples were treated as described above by passing the water through a mineral matrix of 15 g of powdered activated carbon, 3 g hydroxylapatite, and 12 g calcium carbonate. The results are summarized below in Table XVII.

TABLE XVII

Removal of Lead and Copper from Water from Different Areas

| | Salt Lake City, UT | Los Angeles, CA | Birmingham, AL | Terre Haute, IN | Idaho Falls, ID |
|---|---|---|---|---|---|
| Initial Conditions of water before spiking with Pb and Cu | | | | | |
| pH | 7.55 | 7.39 | 8.18 | 7.53 | 8.43 |
| $Ca^{+2}$ (ppm) | 62 | 30.5 | 26.5 | 61 | ~0 |
| $F^-$ (ppm) | 0.2 | 0.65 | 0.9 | 0.65 | 0.1 |
| $Cl^-$ (ppm) | 50.5 | 23.5 | 7.2 | 39 | 15.6 |
| $NO_2^-$ (ppm) | ~0 | ~0 | ~0 | ~0 | ~0 |
| $NO_3^-$ (ppm) | 6.5 | 8.9 | 2.5 | 7.3 | 6.5 |
| $PO_4^{-3}$ (ppm) | ~0 | ~0 | ~0 | ~0 | ~0 |
| $SO_4^{-2}$ (ppm) | 119 | 70.2 | 21 | 125 | 26.8 |
| $Pb^{+2}$ (ppb) | ~0 | ~0 | ~0 | ~0 | ~0 |
| $Cu^{+2}$ (ppm) | ~0 | ~0 | ~0 | ~0 | ~0 |
| After Treatment | | | | | |
| pH | 7.61 | 7.48 | 8.21 | 7.60 | 8.44 |
| $Ca^{+2}$ (ppm) | 64.5 | 32 | 28 | 64 | 31 |
| $Pb^{+2}$ (ppb) | 0.3 | 0.1 | 0.1 | 0.2 | 0.1 |
| $Cu^{+2}$ (ppm) | 0.19 | 0.11 | ~0 | 0.21 | ~0 |
| $PO_4^{-3}$ (ppm) | 1.85 | 1.97 | 1.78 | 1.83 | 1.77 |

The results show the removal of lead and copper to very small concentrations, without introducing significant phosphate, or without increasing the hardness, i.e., the calcium concentration.

Example XVIII

This is a comparative examples where activated carbon alone was used in the matrix. The solutions were prepared from tap water (Ca=59 ppm, P=0 ppm, Cu=0 ppm, Pb=0 ppb, pH=7.4) with addition of lead and copper to achieve concentrations of 1000 ppb of Pb, and 5 ppm of Cu. The composition of the mineral mixture was 30 grams powdered activated carbon. The results at various flow rates are summarized below in Table XVI.

TABLE XVIII

Activated Carbon Matrix

| Flow Rate (ml/min.) | Final pH | Final Ca | Final P | Final Cu | Final Pb |
|---|---|---|---|---|---|
| 1500 | 7.43 | 55.5 | ~0 | 4.80 | 950 |
| 1000 | 7.43 | 55.0 | ~0 | 4.75 | 900 |
| 500 | 7.44 | 53.5 | ~0 | 4.60 | 900 |
| 130 | 7.45 | 52.0 | ~0 | 4.55 | 880 |

The results show that only a negligible amount of copper and lead were removed by the matrix containing only activated carbon.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for removing lead and copper from drinking water discharged from a culinary water outlet while suppressing the concentration of phosphate ions comprising directing the water through a matrix comprising a solid hydroxylapatite mineral, and a solid calcium carbonate mineral which is slightly soluble in water, such that there is sufficient contacting between the water and the matrix to introduce sufficient phosphate ions into the water to form a lead phosphate precipitate and to reduce the lead concentration in the water to below 15 parts per billion, and such that insufficient phosphate ions are introduced into the water to raise the phosphate concentration above about 5 parts P per million.

2. The process as in claim 1 wherein insufficient phosphate ions are introduced in the water to raise the phosphate concentration above 3 parts P per million.

3. The process as in claim 1 wherein there is sufficient contacting between the water and the matrix to reduce the copper concentration in the water to below 1.3 parts per million.

4. The process as in claim 1 wherein after directing of water through the mineral matrix the water is passed through a microfilter to retain solid precipitates formed in the matrix.

5. The process as in claim 4 wherein the microfilter has a porosity such that it is capable of removing microorganisms from water passing through the microfilter.

6. The process as in claim 5 wherein the microfilter has a pore size that is 1 micron or less.

7. The process as in claim 6 wherein the microfilter has a pore size that is 0.22 microns or less.

8. A process for removing lead from drinking water discharged from a drinking water outlet comprising directing the water through a matrix comprising a calcium mineral of a solid hydroxylapatite mineral, a solid calcium carbonate mineral which is slightly soluble in water, and an adsorbent, such that there is sufficient contacting between the water and the matrix to introduce sufficient phosphate ions into the water form a lead phosphate precipitate, reduce the lead concentration in the water to below 15 parts per billion, and such that insufficient phosphate ions are introduced into the water to raise the phosphate concentration above about 5 parts P per million.

9. The process as in claim 8 wherein after directing of water through the mineral matrix the water is passed through a microfilter to retain solid precipitates formed in the matrix.

10. The process as in claim 9 wherein microorganisms are removed by the microfilter.

11. The process as in claim 10 wherein the microfilter has a pore size that is 1 micron or less.

12. The process of claim 8 wherein the adsorbent is present in sufficient amount to substantially reduce concentrations of disinfection byproducts in the drinking water from the drinking water outlet.

13. The process of claim 8 the adsorbent is chosen from the group consisting of activated carbon, activated alumina, molecular sieves, and silica gel.

14. The process of claim 8 the adsorbent is activated carbon.

15. A process for removing lead and copper from drinking water discharged from a culinary water outlet while suppressing the concentration of phosphate ions comprising directing the water through a matrix comprising a solid phosphate mineral, and a solid carbonate mineral with a cation the same as the phosphate mineral and which is slightly soluble in water, such that there is sufficient contacting between the water and the matrix, and the solubility of the phosphate mineral is such to introduce sufficient phosphate ions into the water to form a lead phosphate precipitate and reduce the lead concentration in the water to below 15 parts per billion, and maintain the phosphate concentration in the water below about 5 parts P per million.

16. The process of claim 15 wherein the phosphate and carbonate minerals are calcium minerals or magnesium minerals.

* * * * *